United States Patent Office

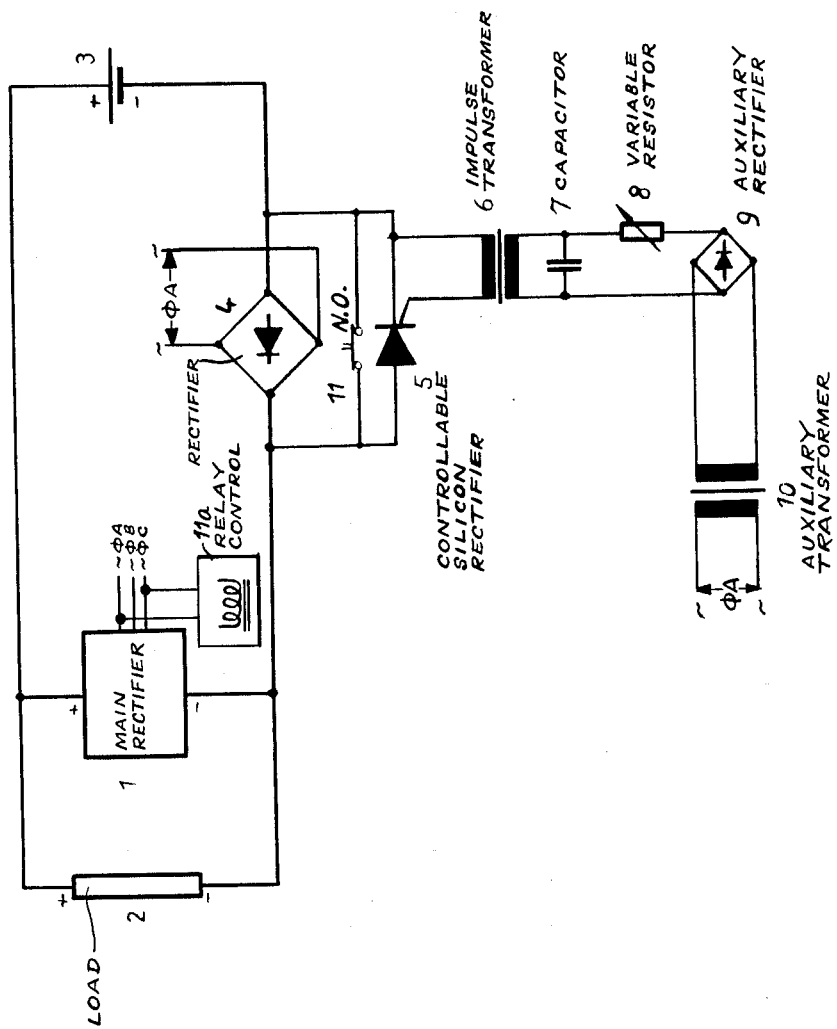

3,240,949
Patented Mar. 15, 1966

3,240,949
POWER-SUPPLY APPARATUS WITH A BATTERY BEING PROVIDED FOR SUPPLYING THE LOAD IN THE EVENT OF FAILURE OF MAIN RECTIFIED SUPPLY
Joachim M. Balkow and Wolfgang G. U. Aye, Nurnberg, Germany, assignors to International Standard Electric Corporation, New York, N.Y., a corporation of Delaware
Filed Mar. 13, 1962, Ser. No. 179,440
Claims priority, application Germany, Mar. 14, 1961, St 17,574
3 Claims. (Cl. 307—66)

The present invention relates to a switching arrangement for power-supply apparatus comprising rectifiers, with a battery being provided for supplying the load in the event of a mains failure.

In D.C. power-supply systems it is known to provide a battery for supplying the load with direct current in the event of a mains failure. Generally the battery is charged during the mains-supply operation or is maintained in the charged condition thereafter with the battery and the load being connected in parallel to the main rectifier. For charging the battery, however, there is required a higher voltage which, as a rule, is obtained in such a way that, in series with the main rectifier, there is connected an additional rectifier for producing the necessary additional voltage.

In the event of a mains failure, this additional rectifier must be shorted by the action of a relay switch, which blocks the connection between the battery and the load. In the course of this, difficulties are likely to appear insofar as a certain time elapses before the relay switch operates and directly connects the battery to the load. In many power-supply systems, the voltage breakdown appearing in the course of this sequence of events is unbearable. For this reason, rectifier plates have already been connected in parallel to the relay switch with these plates permitting a switching without interruption. In this case, there is made use of the so-called threshold voltage of the selenium rectifier. As is well known, the characteristic of the selenium rectifier is curved in the forward direction at a voltage of about 0.5 volt, so that the rectifier plate, in the case of a voltage below 0.5 volt, will not permit the passage of a noticeable current. Hence, the current increases considerably upon exceeding the so-called threshold voltage. The number of cells of the stand-by or spare battery and, consequently, also the voltage of the additional rectifier depend on the value of the load voltage. In the case of lead storage cells, which are generally used in the power-supply systems of telephone installations, there is allotted a voltage of 2.0 volts per cell for feeding the load. The charge-maintaining voltage, however, amounts to 2.2 volts per cell, so that the additional rectifier has to provide 0.2 volt per cell for the purpose of maintaining the charge. For example, if 60 volts are required at the load, then 30 lead storage cells will be necessary to this end, so that 6 volts will have to be supplied by the additional rectifier for the purpose of maintaining the charge. Recognizing that each rectifier plate has a threshold voltage of 0.5 volt, then at least 12 such rectifier plates are required for the rectifier connected in parallel to the switch. The size of the rectifier plates must also be dimensioned in accordance with the relatively high current pulse flowing through the rectifier during the switchover process, because the rectifier is traversed by the total load current during the switchover time.

Subsequent to the mains failure, the battery will supply the current for the load. Upon return of the mains current, the battery is discharged to a considerable extent, and must therefore be recharged to its full voltage value. For completely charging a lead storage battery, however, 2.4 volts are required per cell. This voltage is obtained in that the additional rectifier is designed in a manner capable of being switched over correspondingly, so that the voltage from the additional rectifier will increase the voltage to the value of 2.4 volts per cell. In the example of 30 cells as mentioned hereinbefore, there is thus required an additional voltage of 12 volts, which has to be supplied by the additional rectifier. In order to prevent the additional rectifier from being short-circuited by the rectifier connected in parallel to the switch, the latter has to be dimensioned in accordance with the voltage applied to the additional rectifier. The selenium rectifier, which is used as the rectifier connected in parallel to the switch, is thus required to have a total threshold voltage of 12 volts, that is, in this case 24 rectifier plates are required with a threshold voltage of 0.5 volt each.

The voltage drop of the individual selenium rectifier plates which are connected in series is added up, and when dimensioning the rectifier with respect to a complete charging of the battery, that is for 2.4 volts per cell, there would appear such a high voltage drop at the rectifier connected in parallel to the switch in the event of a mains failure, that the decrease in voltage appearing in the course of this would be no longer acceptable in many cases of practical application. For this reason, it is additionally necessary that the selenium rectifier which is used as rectifier connected in parallel to the switch, and in the case of a complete charging of the battery, be switched over for the higher voltage of the additional rectifier and, subsequent to the completed charging, be reduced again to the number of plates corresponding to the additional voltage in cases where the charge is maintained with a voltage of 2.2 volts per cell.

These disadvantages are avoided by the circuit arrangement according to the invention.

For the purpose of effecting an uninterrupted switchover in power-supply systems employing rectifier devices, stand-by or spare batteries and additional rectifiers for the purpose of charging or maintaining the charge of the battery, a controllable silicon rectifier is connected, according to the invention, in parallel to the relay switch for shorting the additional rectifier in the event of a mains failure. The control electrode of this controllable silicon rectifier receives a voltage pulse in the event of a mains failure, so that the silicon rectifier will be changed for a time into the conductive state.

Unlike the arrangements employing selenium rectifiers connected in parallel to the switch, this inventive type of switching arrangement offers several advantages. The commercial available types of controllable silicon rectifiers serve to block higher voltages than are actually necessary for charging e.g. a lead storage battery comprising 30 cells for the additional rectifier, so that there is only required one single controllable silicon rectifier. Also when switching over from charging to the maintaining of the charge and vice versa, it is no longer necessary to connect or disconnect the rectifier elements. In addition thereto, the voltage drop across the silicon rectifier is substantially smaller than across a selenium rectifier serving the same purpose. The voltage drop across a silicon rectifier that is capable of being switched is in the order of 1.5 volts, so that in the event of a main failure, and when using a lead storage battery comprising 30 cells, the load voltage will amount to 64.5 volts, because during normal operation of the battery is held at a charge-maintaining voltage of 2.2 volts per cell, so that the battery altogether has a voltage of 66 volts. The voltage breakdown during the switchover process, caused by the voltage drop of the silicon rectifier, is therefore very low. In comparison therewith, the voltage drop in the case of a selenium rectifier which is arranged in parallel to the relay switch serving the shorting of the additional rectifier, is substantially higher. In this case, the load voltage, when using a battery comprising 30 cells, e.g. amounts to only 56 volts.

There may also be omitted all movable parts which are known to be necessary for effecting the switching-over of a selenium rectifier when changing over from the maintaining of the charge to the charging, and vice versa.

The fact that no switchover is required in the case of the controllable silicon rectifier during the charging process also has the added advantage that the additional rectifier may be of the type capable of being regulated, and hence that the additional rectifier, upon reaching a certain voltage at the battery, automatically changes over from the full charge to the charge maintenance function. When using a selenium rectifier as the rectifier connected in parallel to the switch, this is not possible without further ado, because in this case there would be required a simultaneous switchover of the rectifier.

Controllable types of silicon rectifiers are also suitable for employment in a switching arrangement comprising up to 115 lead storage cells acting as a stand-by or spare battery, in which case one single silicon rectifier is sufficient for acting as the rectifier connected in parallel to the switch, whereas when using selenium rectifiers for this purpose, a corresponding number of rectifier plates would have to be connected in series, so that there would not only result a considerable expenditure on rectifier plates, but also a relatively high voltage drop.

Finally, when using a controllable type of silicon rectifier according to the invention, there will also be noticed a saving of both volume and weight.

The controllable type of silicon rectifier operates within a period of four microseconds, so that there is a practically instantaneous switchover from the mains to the battery supply.

The voltage impulse which is necessary for effecting the switching-over of the controllable silicon rectifier may be produced in different ways. Most advantageously this impulse is produced by the discharge of a capacitor which is permanently connected to voltage during the mains-supply operation.

The invention will now be explained in detail with reference to an exemplary embodiment. The circuit arrangement as shown in the accompanying drawing consists of a main rectifier 1 normally supplying the load 2. The battery 3 is connected in parallel to both the main rectifier and the load, and is so dimensioned that the load will receive the necessary voltage in the case of a mains failure. When using lead storage cells, the battery is so dimensioned that the charge is based on a voltage of 2 volts per cell. For charging the battery 3, as well as for maintaining the charge, the additional rectifier 4 is connected in series with the main rectifier 1 to the battery 3. For maintaining the charge, the said additional rectifier supplies a voltage which is so dimensioned that the battery will receive 2.2 volts per cell. For the purpose of charging the battery, the additional rectifier is switched over to a higher voltage, so that the battery will receive 2.4 volts per cell.

At the instant of the mains failure, the battery is incapable of taking over the supply of the load immediately, because the additional rectifier blocks the battery current. For this reason, the additional rectifier is shorted by a switching relay 11. As a rule, the switching time for this short-circuit relay amounts to about 100 milliseconds, so that the voltage at the load will go down to zero until the short-circuit relay is closed. For avoiding this voltage fall, a selenium rectifier has already been connected in parallel to the short-circuit switching relay which, however, has the above-described disadvantages.

According to the invention, it is proposed to connect a controllable silicon rectifier 5 in parallel to the short-circuit switching relay 11. This rectifier is switched over into the conducting state by the action of an impulse. This impulse is produced by a capacitor 7. Between the control electrode of the controllable silicon rectifier 5 and the capacitor 7 there is connected the impulse transformer 6. In the case of a mains-supply operation, the capacitor 7 is maintained in its charged state via both the auxiliary transformer 10 and the auxiliary rectifier 9. With the aid of the variable charging resistance 8, it is possible to exert an influence upon the charging voltage of the capacitor. At the instant of the mains failure, the capacitor 7 is discharged via the impulse transformer 6. On the secondary side of the impulse transformer 6, there is produced a voltage which is intended to effect the switchover of the controllable silicon rectifier 5 into the conducting state. The secondary side of the impulse transformer is connected to both the control electrode and to the negative pole of the silicon rectifier 5.

For switching the controllable silicon rectifier 5 into its conducting state, there is required a priming pulse having a duration of about 4 microseconds. Both the impulse transformer 6 and the capacitor 7 have to be so dimensioned as to provide the necessary power for switching the silicon rectifier 5 into its conducting state. After the switchable silicon rectifier has been changed into its conducting state by the action of the impulse, the current from the battery to the load will flow via the silicon rectifier until the latter is bridged by the short-circuit switching relay 11. Thereupon the battery is directly connected to the load.

While we have described the principles of our invention in connection with specific apparatus, it is to be clearly understood that this description is made only by way of example and not as a limitation to the scope of our invention as set forth in the objects thereof and in the accompanying claims.

What is claimed is:

1. In a power circuit having a main rectifier connected across a load, a battery for supplying said load in the event of failure of output from said main rectifier, and an additional rectifier for charging and maintaining the charge on said battery, a first terminal of said battery being coupled to a first output terminal of said main rectifier and a second terminal of said battery being coupled through said additional rectifier to a second output terminal of said main rectifier, a switching arrangement for short circuiting said additional rectifier in the event of said failure of output, said switching arrangement comprising a relay switch, connectable across said additional rectifier, and a silicon rectifier connected across said additional rectifier, said silicon rectifier being controllable by means of a control electrode, said control electrode being energizable by a voltage impulse upon failure of output of said main rectifier, and the polarity of voltage impulse applied to said control electrode being such as to switch said silicon rectifier into the conductive state.

2. A switching arrangement in accordance with claim 1, in which said voltage impulse is derived from the discharge of a capacitor which is normally charged from a power supply connected to a source of power.

3. A switching arrangement in accordance with claim 2, in which said capacitor is connected through an impulse transformer to said control electrode and to the negative electrode of said silicon rectifier.

References Cited by the Examiner
UNITED STATES PATENTS

| | | | |
|---|---|---|---|
| 1,874,374 | 8/1932 | Sole | 307—66 |
| 2,920,240 | 1/1960 | Macklem | 323—22 |

LLOYD McCOLLUM, *Primary Examiner.*